(12) United States Patent
Anadon et al.

(10) Patent No.: US 10,721,299 B2
(45) Date of Patent: Jul. 21, 2020

(54) COORDINATING SECTIONS OF A WEBPAGE USING AUTOMATIC COMMUNICATIONS

(71) Applicant: Criteo SA, Paris (FR)

(72) Inventors: Laurent Anadon, Paris (FR); Komlan Akpédjé Kedji, Cormeilles en Parisis (FR)

(73) Assignee: Criteo SA, Paris (FR)

( * ) Notice: Subject to any disclaimer, the term of this patent is extended or adjusted under 35 U.S.C. 154(b) by 289 days.

(21) Appl. No.: 15/928,030

(22) Filed: Mar. 21, 2018

(65) Prior Publication Data
US 2019/0297143 A1 Sep. 26, 2019

(51) Int. Cl.
*H04L 29/08* (2006.01)
*G06Q 30/02* (2012.01)

(52) U.S. Cl.
CPC ..... *H04L 67/1095* (2013.01); *G06Q 30/0276* (2013.01); *H04L 67/02* (2013.01); *H04L 67/146* (2013.01)

(58) Field of Classification Search
CPC ... H04L 67/1095; H04L 67/02; H04L 67/146; G06Q 30/0276

USPC ........................................................ 709/217
See application file for complete search history.

(56) References Cited

U.S. PATENT DOCUMENTS

| | | | |
|---|---|---|---|
| 2003/0187744 A1* | 10/2003 | Goodridge, Jr. | G06F 3/0481 705/26.1 |
| 2009/0287995 A1* | 11/2009 | Tsao | G06F 40/14 715/234 |
| 2014/0372873 A1* | 12/2014 | Leung | G06F 16/958 715/243 |
| 2017/0052994 A1* | 2/2017 | Jain | G06F 16/9562 |

* cited by examiner

*Primary Examiner* — Minh Chau Nguyen
(74) *Attorney, Agent, or Firm* — Proskauer Rose LLP (57) ABSTRACT

Methods and systems are described herein for coordinating a plurality of sections of a webpage. A browser application at a client computing device renders a webpage comprising a plurality of sections, each section containing source code. The browser application determines a master section of the plurality of sections using communications between at least a subset of the plurality of sections. The master section determines one or more attributes associated with at least a subset of the plurality of sections. The master section transmits the one or more attributes to a remote computing device, synchronizes a behavior of at least a subset of the plurality of sections, or both.

29 Claims, 3 Drawing Sheets

COORDINATING SECTIONS OF A WEBPAGE USING AUTOMATIC COMMUNICATIONS

TECHNICAL FIELD

The present technology relates to systems, methods, and computer program products for coordinating sections of a webpage using automatic communications.

BACKGROUND

Websites, such as e-commerce platforms and online content platforms (e.g., publisher sites), are comprised of a complex collection of webpages and related data elements, arranged in a defined structure. Many times, each webpage on a particular website is comprised of a plurality of sections (e.g., iFrames) that display a variety of different content to a user—including in some cases, source code that comprises digital ads or product displays. The coordination of content in the plurality of sections is important to providing a dynamic and customized experience for the user, as well as maximizing the opportunity for publishers and advertisers to utilize the various sections in an efficient and intelligent way.

However, because the sections are typically loaded at runtime (e.g., the time at which the webpage is rendered on the client's computer, tablet, or mobile device) and the sections are generally independent from each other (e.g., the source code generated for each section is different and the sections do not communicate with each other), existing technologies are unable to detect both the number of such sections in a webpage and the particular attributes (e.g., product, publisher, content characteristics, location, etc.) of these sections—information that is important for publishers and advertisers to deliver the experience noted above. In addition, the lack of communication capabilities between the various sections of a webpage hampers the ability of the webpage to synchronize the delivery of content among the sections.

SUMMARY

Accordingly, there is a need for technology to dynamically and programmatically establish and coordinate a plurality of sections in a webpage, including the capability for these sections to communicate with each other, in order to determine relevant features of the sections in the webpage and relay associated information to a remote computing device for analysis and generation of customized webpage content. The systems and methods described herein provide the technical improvement of creating a communication paradigm between sections of a webpage at the time the webpage is rendered (e.g., using JavaScript technology and customized algorithms) to overcome existing technological limitations of webpage source code.

In one aspect, there is a computerized method of coordinating a plurality of sections of a webpage. A browser application at a client computing device renders a webpage comprising a plurality of sections, each section containing source code. The browser application determines, using communications between at least a subset of the plurality of sections, a master section of the plurality of sections. The master section of the plurality of sections determines one or more attributes associated with at least a subset of the plurality of sections. The master section transmits the one or more attributes to a remote computing device, the master section synchronizes a behavior of at least a subset of the plurality of sections, or both.

In another aspect, there is a system for coordinating a plurality of sections of a webpage. The system comprises a browser application at a client computing device that renders a webpage comprising a plurality of sections, each section containing source code. The browser application determines, using communications between at least a subset of the plurality of sections, a master section of the plurality of sections. The master section of the plurality of sections determines one or more attributes associated with at least a subset of the plurality of sections. The master section transmits the one or more attributes to a remote computing device, the master section synchronizes a behavior of at least a subset of the plurality of sections, or both.

Any of the above aspects can include one or more of the following features. In some embodiments, the plurality of sections comprises one or more iframes. In some embodiments, determining a master section of the plurality of sections comprises communicating, by each section of the plurality of sections, an identifier assigned to the section to each of the other sections; acknowledging, by each section of the plurality of sections, the identifier received from each of the other sections; generating, by each section of the plurality of sections, a list comprising the identifier received from each of the other sections; and identifying, by each section of the plurality of sections, a master section based upon the list of identifiers.

In some embodiments, each section is assigned an identifier having a different value. In some embodiments, the webpage assigns the identifier to each section. In some embodiments, communicating the identifier to each of the other sections comprises: storing, by each section of the plurality of sections, a message comprising the assigned identifier in a storage area of the browser application; and transmitting, by the browser application, the stored message to each of the other sections. In some embodiments, each section of the plurality of sections stores the message using a sessionStorage object.

In some embodiments, acknowledging the identifier received from each of the other sections comprises: storing, by each section of the plurality of sections, an answer message in a storage area of the browser application; and transmitting, by the browser application, the stored answer message to each of the other sections. In some embodiments, identifying a master section based upon the list of identifiers comprises identifying the section of the plurality of sections that is assigned the identifier with the highest value. In some embodiments, identifying a master section based upon the list of identifiers comprises identifying the section of the plurality of sections that is assigned the identifier with the lowest value.

In some embodiments, each section communicates the assigned identifier to each of the other sections upon being loaded into the webpage by the browser application. In some embodiments, the master section transmits the attribute to the remote computing device upon expiration of a predetermined time period.

In some embodiments, the one or more attributes comprise one or more of: a count of the plurality of sections, a publisher associated with the source code of one or more of the plurality of sections, a product associated with the source code of one or more of the plurality of sections, an advertiser associated with the source code of one or more of the plurality of sections, a user interaction with the source code of one or more of the plurality of sections, or a list of session IDs and a publisher associated with the source code of one or more of the plurality of sections. In some embodiments, each section of the plurality of sections communicates at least one attribute to each of the other sections.

In some embodiments, the remote computing device uses the count of the plurality of sections received from the webpage to adjust a bid value associated with an impression opportunity in a future webpage. In some embodiments, the remote computing device uses the count of the plurality of sections received from the webpage to predict a count of sections in another webpage. In some embodiments, the remote computing device uses the product associated with the source code of one or more of the plurality of sections to adjust one or more visual characteristics of the source code of one or more of the plurality of sections. In some embodiments, the one or more visual characteristics of the source code comprise a display duration associated with the product, a presence of the product, or an emphasis associated with the product.

In some embodiments, the remote computing device uses the user interaction with the source code of one or more of the plurality of sections to adapt the source code of at least one of the plurality of sections. In some embodiments, the remote computing device adapts the source code of at least one of the plurality of sections to display a different product. In some embodiments, the source code comprises an ad creative. In some embodiments, the ad creative comprises a display ad, an audio ad or a video ad.

In some embodiments, the master section transmits the attribute to the remote computing device using at least one of: a pixel in the webpage, an XML HttpRequest, a Fetch API, or a Beacon API. In some embodiments, the communications between at least a subset of the plurality of sections to determine the master section comprise one or more messages transmitted between the at least a subset of the plurality of sections. In some embodiments, each section of the at least a subset of the plurality of sections transmits a message to the other sections upon loading into the webpage. In some embodiments, the communications between at least a subset of the plurality of sections to determine the master section are generated based upon a consensus algorithm.

In some embodiments, synchronizing a behavior of the plurality of sections comprises synchronizing an animation between at least a subset of the plurality of sections. In some embodiments, synchronizing a behavior of the plurality of sections comprises synchronizing a product display between at least a subset of the plurality of sections.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The present technology provides systems and methods for coordinating a plurality of sections of a webpage using automatically-generated communications between the sections upon loading the webpage. Although the technology is illustrated and described herein with reference to specific embodiments, the technology is not intended to be limited to the details shown. Various modifications can be made in the details within the scope of the claims and without departing from the technology.

Figure 1:
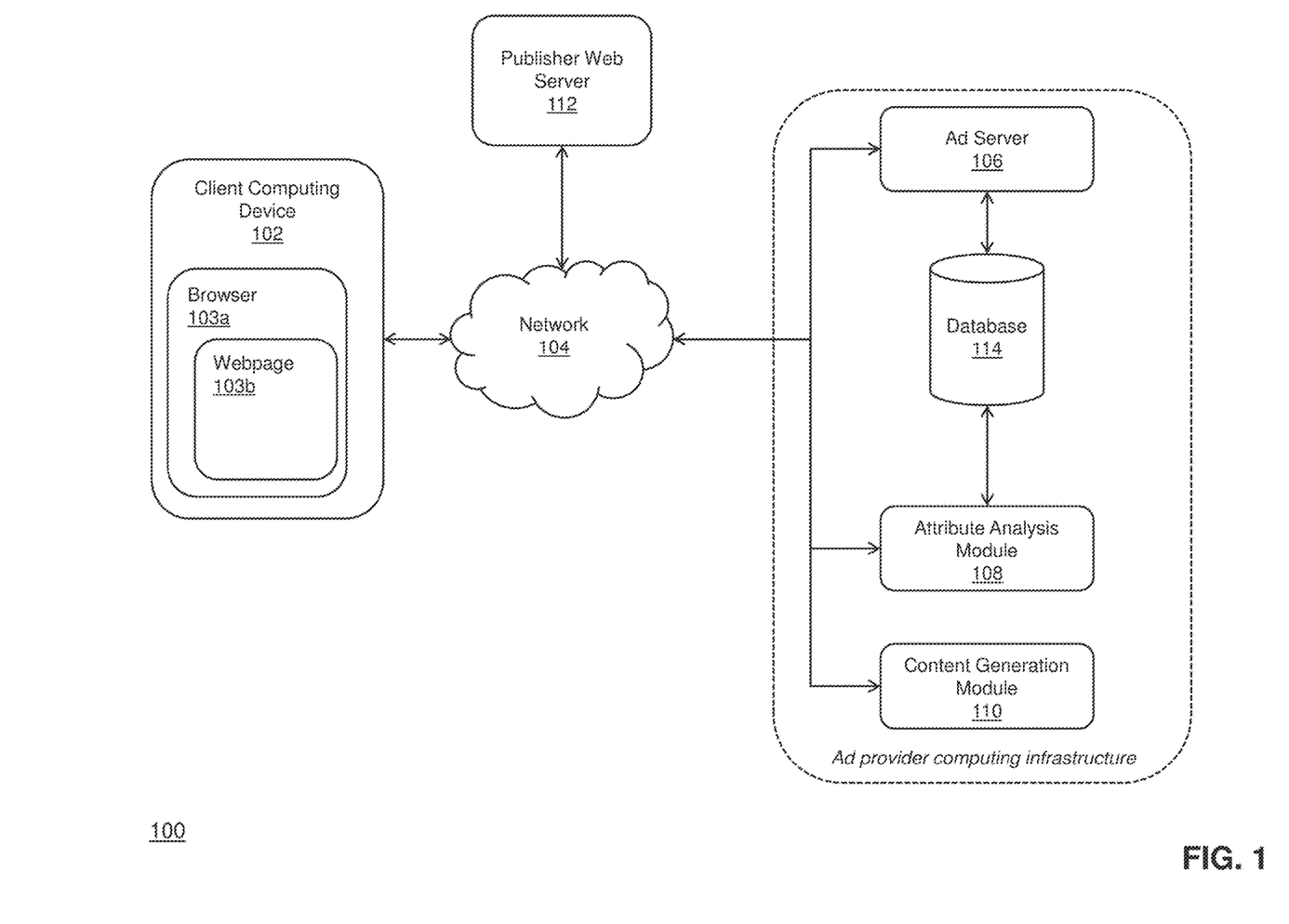
FIG. 1 is a diagram of a networked system in accordance with embodiments of the technology.

FIG. 1 is a diagram of networked system 100 in accordance with embodiments of the technology. As illustrated, networked system 100 includes a client computing device 102 that is capable of executing a browser application 103*a* for presentation of webpages (e.g., webpage 103*b*) to a user at client computing device 102. Exemplary client devices 102 include but are not limited to desktop computers, laptop computers, tablets, mobile devices, and smartphones. It should be appreciated that other types of computing devices that are capable of connecting to the components of the system 100 can be used without departing from the scope of invention. Although FIG. 1 depicts a single client computing device 102, it should be appreciated that the system 100 can include any number of client devices.

The browser application 103*a* comprises software executing on a processor of the client computing device 102 that enables the client device to communicate via HTTP with remote servers addressable with URLs (e.g., web server 112) to receive website-related content, including webpages 103*b*, for rendering in the browser application and presentation on a display device coupled to the client device 102. Exemplary browser application software includes, but is not limited to, Internet Explorer™, Firefox™, Chrome™ and other similar software. The webpage 103*b* can comprise visual and audio content for display to and interaction with a user.

Networked system 100 includes a publisher web server 112 (e.g., a computing device or devices) that hosts a website, to which the client computing device 102 connects to retrieve and display webpage 103*b* content. In some embodiments, the website is an e-commerce platform from a retailer selling online goods or services. In some embodiments, the website is an online content platform selling advertising placements (e.g., for ad creatives (audio/video ads), and other content). Typically, the website comprises a plurality of visual and non-visual elements that make up the content transmitted and displayed to a user when, e.g., browser software and/or application software 103*a* on a remote computing device 102 connects to the web server 112 via a communications network 104 (e.g., Internet) and requests content from the website. The elements of a website include, but are not limited to, webpages (e.g., HTML documents), image files, layouts, color sets, stylesheets, document object models (DOM), tracking elements, instrumentations (e.g., analytics, advertisement display, etc.), metadata, URLs, advertisements, and content (e.g., text, audio, video).

The network 104 enables the devices of the system 100 (i.e. client computing device 102, ad server 106, modules 108 and 110, publisher web server 112) to communicate with each other as part of the overall process of coordinating sections of a webpage (e.g., webpage 103*b*) using automatic communications as described herein. The network 104 may be a local network, such as a LAN, and/or a wide area network, such as the Internet and/or a cellular network. In some embodiments, the network 104 is comprised of several discrete networks and/or sub-networks (e.g., cellular to Internet) that enable the components of the system 100 to communicate with each other.

Ad server 106 is a combination of hardware, including one or more special-purpose processors and one or more physical memory modules, and specialized software engines that execute on the processor of the server computing device 106, to receive data from other components of the system 100, transmit data to other components of the system 100, and perform functions relating to coordinating sections of a webpage using automatic communications as described herein. In one embodiment, ad server 106 can collect behavioral data for a plurality of devices, browsers, and/or applications. In some embodiments, ad server 106 can receive behavioral data for a plurality of devices, browsers, and/or applications from third-parties. In some embodiments, ad server 106 can provide graphical display source code for a computerized graphical advertisement display in accordance with the present technology—for example, ad server 106 can generate graphical display source code (e.g., HTML, XML, and other types of code) for presentation on client computing device 102 as part of an advertising impression opportunity within webpage 103*b*. In some embodiments, ad server 106 creates graphical display source code that corresponds to, or refers to (e.g., via URL), content such as display ads, audio ads, video ads and the like.

Attribute analysis module 108 and content generation module 110 are specialized software engines that execute on one or more processors of, and interacts with memory modules of, one or more computing devices (e.g., server devices in the ad provider computing infrastructure), to receive data from other components of the system 100, transmit data to other components of the system 100, and perform functions relating to coordinating sections of a webpage using automatic communications as described herein. In some embodiments, modules 108 and 110 are specialized sets of computer software instructions programmed onto one or more dedicated processors of computing devices and can include specifically-designated memory locations and/or registers for executing the specialized computer software instructions. Further explanation of the specific processing performed by modules 108 and 110 is provided below.

The database 114 is a computing device (or in some embodiments, a set of computing devices) that is coupled to ad server 106 and attribute analysis module 108, and database 114 is configured to receive, generate, and store specific segments of data relating to the process of coordinating sections of a webpage using automatic communications as described herein. In some embodiments, all or a portion of the database 114 can be integrated with the ad server 106 or be located on a separate computing device or devices within the ad provider computing infrastructure. For example, the database 114 can comprise one or more databases, such as MySQL™ available from Oracle Corp. of Redwood City, Calif.

Figure 2:
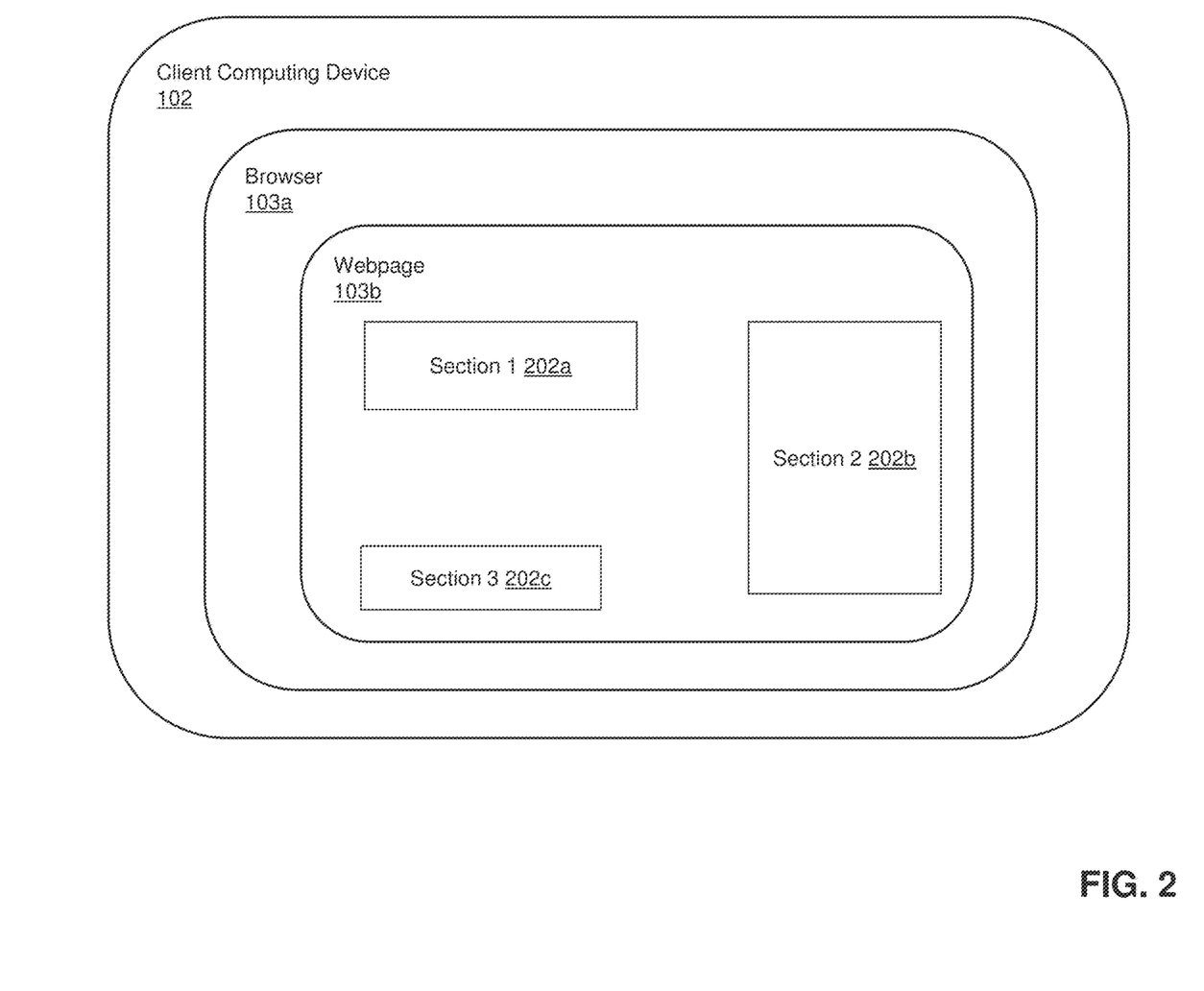
FIG. 2 is a diagram of a client computing device in accordance with embodiments of the technology.

FIG. 2 is a diagram of a client computing device 102 of system 100 in accordance with embodiments of the technology. As shown in FIG. 2, the client computing device 102 executes browser application 103*a* for rendering and display of website content, including webpage 103*b*. As can be appreciated, the webpage 103*b* is comprised of source code (e.g., HTML, CSS, XML, JavaScript) that includes or defines a plurality of sections 202*a*-202*c*. In one embodiment, the plurality of sections 202*a*-202*c* are inline frames, or iframes, that each comprises a separate part of the webpage and in some cases, includes separate source code from one or more different sources (e.g., different websites). Typically, the iframes are independent of each other, acting in some instances as a separate browser window, and do not have the capability of directly communicating with each other. In some cases, the iframes can comprise content from and be associated with the same source (e.g., an advertiser or ad content delivery service).

Figure 3:
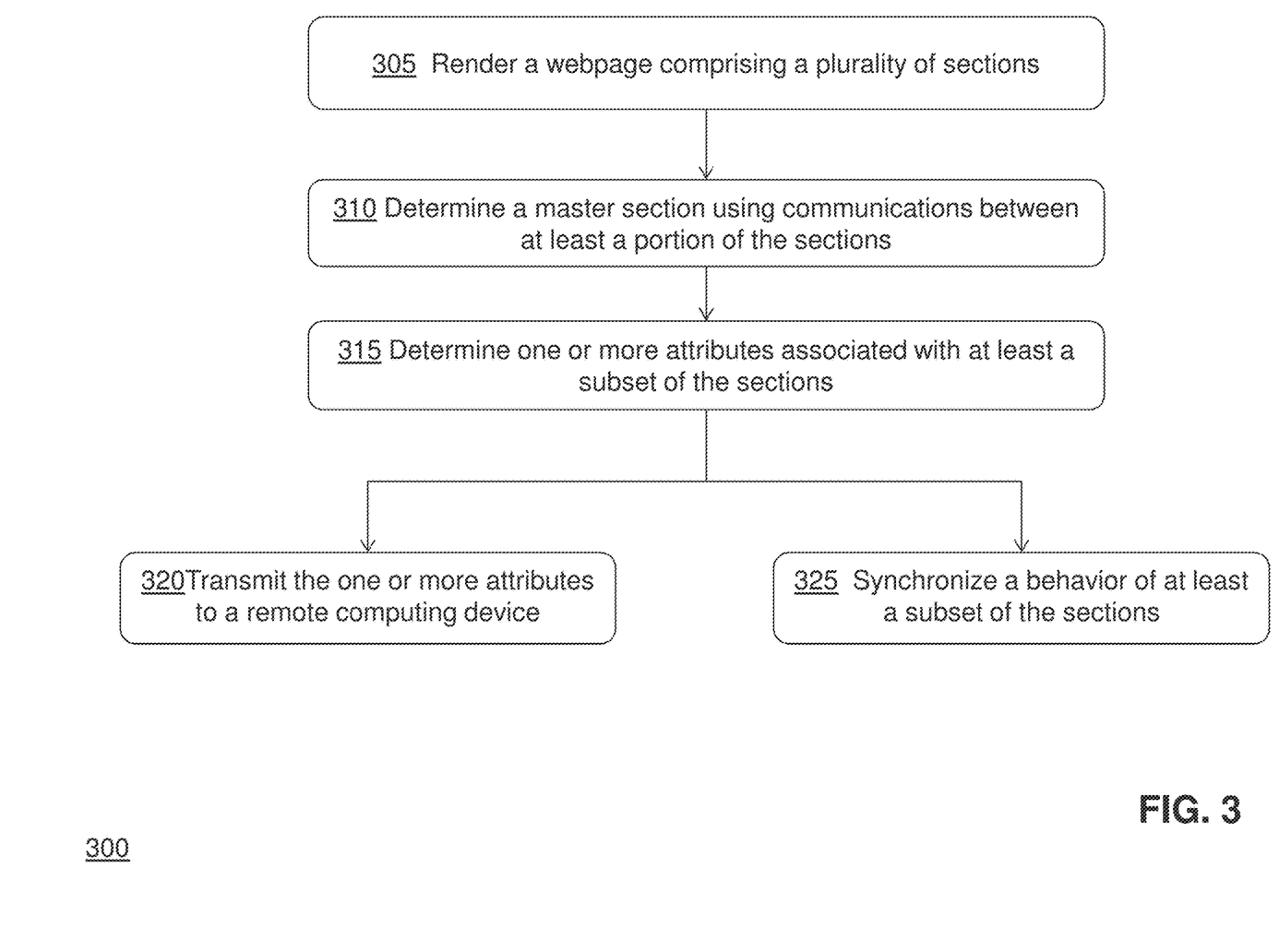
FIG. 3 is a flow diagram of a computerized method of coordinating sections of a webpage using automatic communications.

FIG. 3 is a flow diagram of a computerized method of coordinating sections of a webpage (e.g., webpage 103*b* on client device 102) using automatic communications, via the system 100 of FIG. 1. The client computing device 102 establishes an HTTP session with publisher web server 112 via browser application 103*a* (e.g., via a URL provided to the browser application) and the web server 112 delivers HTML content (e.g., webpage 103*b*) to the browser application. The browser application 103*a* renders (305) the webpage 103*b*, which comprises a plurality of sections 202*a*-202*c* as described previously. Each section 202*a*-202*c* of the webpage 103*b* includes source code (e.g., HTML, XML, JavaScript, etc.) that relates to the content being displayed in the corresponding section 202*a*-202*c*.

In some embodiments, the source code in each section 202*a*-202*c* of the webpage includes one or more references (e.g., a URL) to content provided by ad server 106. For example, sections 202*a*-202*c* may each correspond to an advertising impression that refers to content from one or more ad servers (e.g., ad server 106), and when the browser application 103*a* renders the webpage 103*b*, browser application 103*a* executes code in the sections 202*a*-202*c* to request content from the ad server(s) (e.g., an ad creative) for display in the sections 202*a*-202*c*.

In one embodiment, as the browser application 103*a* renders the webpage 103*b* on the client device 102, the browser application 103*a* assigns each section an identifier (e.g., an int value between 0 and 1000). In some embodiments, the browser application 103*a* assigns a random identifier to each section 202*a*-202*c* as they are loaded into the webpage 103*b*. In an alternative embodiment, ad server 106 provides an identifier to each section 202*a*-202*c* along with the advertising content when requested by the browser application 103*a*. For example, the ad server 106 can provide an identifier that is proprietary or internal to the ad provider (e.g., an impression id) for each section 202*a*-202*c*. It should be appreciated that other types of identifiers can be used in conjunction with the methods and systems described herein.

In addition, each section maintains a list of known identifiers of the sections in the webpage. In order for each section to discover the existence of, and attributes of, other sections in the webpage, each section 202*a*-202*c* of the webpage broadcasts a message to each of the other sections 202*a*-202*c* in the webpage 103*b*. Because the sections are generally not able to communicate directly with each other, the systems and methods described herein use an advantageous technique to accomplish the broadcast of messages between sections of the webpage.

Upon loading into the webpage, each section 202*a*-202*c* writes data (e.g., as key-value pairs) to the sessionStorage object of the browser application 103*a* (e.g., via a sessionStorage JavaScript API), where the data can comprise data elements such as the assigned identifier for the section and other attribute data of the section (e.g., publisher, advertiser, product details, visual details, and the like) as will be explained herein. The sessionStorage object persists while the particular webpage 103b is opened in the browser application, and when one section writes data to the sessionStorage object, the browser fires a storage event—which is picked up by the other sections in the webpage, so that the other sections can retrieve the data, including the identifiers of the other sections that have loaded into the webpage, from the sessionStorage object.

For example, as the browser application 103a renders the webpage 103b, the browser assigns section one 202a, an identifier of '467.' Upon loading into the webpage, section one 202a writes its identifier to the sessionStorage object of the webpage. The storage event is fired by the browser, but because the other sections have not yet loaded, these sections do not retrieve the identifier from the sessionStorage object. Subsequently, section two 202b loads into the webpage, is assigned an identifier of '788' and writes its identifier to the sessionStorage object. The storage event is fired, section one 202a retrieves the section two identifier from sessionStorage, adds the section two identifier to its list of known identifiers, and writes an acknowledgment to the sessionStorage object (which includes the identifier of the section sending it, namely the identifier of section one 202a).

The storage event fires again, and this time section two 202b retrieves the section one identifier ('467') from sessionStorage and adds the section one identifier to its list of known identifiers. In this way, as each new section loads into the webpage, each section 202a-202c receives the identifier(s) from other sections and adds the identifier(s) to the section's list of known identifiers.

As part of this process, each section 202a-202c in the webpage 103b can be configured to implement a leader election algorithm to determine (310) which section should be considered as the master or leader, for purposes of coordinating the display of content in the sections 202a-202c. Generally, a leader election algorithm, as executed by the browser application 103a, comprises all of the message transmitting steps described herein, from passing identifiers between the sections 202a-202c to determining a master section based upon the message transmissions. In one example, the leader election algorithm utilized by the browser application 103a results in designation of a section that has the highest assigned identifier as the master. In the example provided in the previous paragraph, section two 202b is considered the master because its identifier is the highest value. It should be appreciated that other types of leader election algorithms, that produce a variety of outcomes with respect to designating a leader section (e.g., a section with the lowest identifier value is the leader), can be utilized within the scope of invention described herein.

Each section 202a-202c analyzes the list of known identifiers maintained in the section, using the processing defined in the leader election algorithm, to determine if it is the master—or if another section is the master. Continuing with the above example (where the section with the highest identifier value is the leader), each section analyzes the list of known identifiers to determine if the identifier assigned to that section is equal to or greater than each of the identifiers in the list of known identifiers. In the case where the master is the section with the highest value identifier, if the identifier is equal to or greater than the other identifiers, then the section understands that it is the master.

The master section also determines (315) one or more attributes associated with at least a subset of the plurality of sections. For example, the master section can retrieve from the sessionStorage object detailed information about some or all of the other sections in the webpage. In some cases, the attributes can include, but are not limited to, a count of the plurality of sections 202a-202c (i.e., how many sections exist on the webpage), a publisher associated with the source code of one or more of the plurality of sections 202a-202c, a product associated with the source code of one or more of the plurality of sections 202a-202c, an advertiser associated with the source code of one or more of the plurality of sections 202a-202c, a user interaction with the source code of one or more of the plurality of sections 202a-202c (e.g., a view, a click, or other type of interaction), or a list of session IDs and a publisher associated with the source code of one or more of the plurality of sections. It should be appreciated that, in some embodiments, the determination of one or more attributes associated with at least a subset of the plurality of sections is performed during the leader election step of the algorithm and, in alternative embodiments, the attribute determination is performed after a master section is determined. The master section and/or each respective section can transmit (320) this information to the server computing device 106, as is explained in greater detail below.

The master section can also synchronize (325) a behavior of at least a subset of the plurality of sections 202a-202c based upon the attribute data, such as animations, product display, and so forth. Synchronization of behavior of at least a subset of the plurality of sections 202a-202c can take a variety of forms.

For example:

Color-Set Synchronization: the master section can select a color-set from among several available color-sets, and then notify the other sections in the webpage 103b to use the selected color-set. The result is that each section of the webpage 103b displays advertising content that has the same color-set.

Product Presence: each section can communicate an aspect or attribute of products displayed in that section (e.g., a product id) to the other sections so that duplicate products are eliminated (and thus not displayed in more than one section). In addition, the master section can select specific products to be displayed in each section and then notify the respective sections of which products to display.

Animation Synchronization: the master section can specify one or more attributes of animations (e.g., duration) to be displayed in the respective sections, and then notify the other sections to restart an animation using the specified attributes—so that animation is synchronized across all of the sections. In some embodiments, the sections can communicate with each other to build consensus on the animation attributes that they will use.

After a predetermined time period, during which the webpage is loading into the browser, the section that has been determined as the master section (or in some embodiments, each respective section) transmits data to the server computing device 106 that includes information associated with the sections 202a-202c in the webpage 103b. The transmission of data by the master section (or the individual sections) to the server computing device 106 can be accomplished through a variety of means, including but not limited to, a pixel embedded in the section and/or in the webpage, an XML HttpRequest, a Fetch API, or a Beacon API.

The attribute analysis module 108 and the content generation module 110 can each receive the data transmission from the master section of the webpage, via communications network 104, and respectively analyze the data to determine one or more actions in response to the collected data, such as generating content for the sections of the webpage, adjusting bids for either present or future impression opportunities in the sections, or other types of actions. These actions can be intended for live usage (i.e., in-browser actions around the same time that the webpage 103b is rendered) or intended for future usage (i.e., subsequent bidding opportunities or displays when the user accesses the same webpage or a different webpage). For example, the attribute analysis module 108 and the content generation module 110 can determine the number of sections on the webpage altogether, sections that are associated with: a particular product, a particular advertiser, or other similar characteristic—in order to accomplish a variety of advantageous data extraction and content generation actions. In one embodiment, the content generation module 110 can receive the collected data from the master section (or the individual sections) handle action selection and live content generation for the sections of the webpage 103b, and the attribute analysis module 108 can receive the collected data from the master section (or the individual sections) and handle processing and storage of the data for subsequent decision-making—e.g., future bidding opportunities, product display opportunities, and the like. It should be appreciated that, in some embodiments, the modules 108 and 110 do not need to be in direct communication with each other; each module 108, 110 can be called independently from the browser application 103a (e.g., using code embedded in the webpage 103b). It also should be appreciated that, in some embodiments, the data processing performed by the attribute analysis module 108 and/or the content generation module 110 can be carried out by the browser application 103a (using code embedded in webpage 103b)—instead of, or in addition to, externally by modules 108 and/or 110 in the ad server computing environment.

In some embodiments, the actions determined as a result of collection and analysis of the data by the attribute analysis module 108 and/or the content generation module 110 include, but are not limited to the following: (i) storing the attributes extracted from the webpage 103b in a data structure that links the attributes to, e.g., the publisher, the webpage 103b URL, the displayed products in one or more of the sections, and so forth. This linking data structure enables the modules 108, 110 to use the information in subsequent bidding, display and recommendation actions; and (ii) replacing a duplicate and/or previously-displayed product in one or more of the sections with a new product recommendation—in real time.

The data generated by the attribute analysis module 108 can help generate a publisher database of websites and/or webpages without depending on unreliable crawlers; determine how 'crowded' the webpage is (e.g., are there too many sections and/or advertisements?); generate different kinds of user fatigue variables; build innovative brand management capabilities to prevent displaying ad creatives more than a certain number of times per page, and the like.

The content generation module 110 can use the data generated by the attribute analysis module 108 to generate dynamically-adaptive content in the plurality of sections 202a-202c on the webpage 103b, or for subsequent webpages. For example, the content generation module 110 can perform real-time adaptation of ad creatives in the sections 202a-202c upon receiving data from the master section that a user has interacted with one or more of the ad creatives in the various sections (e.g., one ad was viewed by the user, a user browsed products on one ad, and the like). In another example, the attribute analysis module 108 can use the count of sections in a particular webpage to predict how many impression opportunities are going to be available in another webpage (e.g., on the same website) or the same webpage in the future. This information is useful in adapting a bid value for the impression opportunities (e.g., a greater number of opportunities may indicate a decrease in bid value). For example, the attribute analysis module 108 can log how many sections are on a particular webpage 103b and how much the system bid for them. Then, when a future bidding opportunity for the same webpage, the same publisher, and/or the same zone arises, the browser application 103a and/or the modules 108, 110 can analyze the logged values when determining a subsequent bid amount.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific-integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method of coordinating a plurality of sections of a webpage, the method comprising:
   rendering, by a browser application at a client computing device, a webpage comprising a plurality of sections, each section containing source code;
   determining, using communications between at least a subset of the plurality of sections, a master section of the plurality of sections;
   determining, by the master section, one or more attributes associated with at least a subset of the plurality of sections; and
   at least one of:
      transmitting, by the master section, the one or more attributes to a remote computing device, or
      synchronizing, by the master section, a behavior of at least a subset of the plurality of sections.

2. The method of claim 1, wherein the one or more attributes comprise one or more of: a count of the plurality of sections, a publisher associated with the source code of one or more of the plurality of sections, a product associated with the source code of one or more of the plurality of sections, an advertiser associated with the source code of one or more of the plurality of sections, a user interaction with the source code of one or more of the plurality of sections, or a list of session IDs and a publisher associated with the source code of one or more of the plurality of sections.

3. The method of claim 2, wherein the remote computing device uses the count of the plurality of sections received from the webpage to adjust a bid value associated with an impression opportunity in a future webpage.

4. The method of claim 3, wherein the remote computing device uses the product associated with the source code of one or more of the plurality of sections to adjust one or more visual characteristics of the source code of one or more of the plurality of sections.

5. The method of claim 4, wherein the one or more visual characteristics of the source code comprise a display duration associated with the product, a presence of the product, or an emphasis associated with the product.

6. The method of claim 3, wherein the remote computing device uses the count of the plurality of sections received from the webpage to predict a count of sections in another webpage.

7. The method of claim 2, wherein the remote computing device uses the user interaction with the source code of one or more of the plurality of sections to adapt the source code of at least one of the plurality of sections.

8. The method of claim 7, wherein the remote computing device adapts the source code of at least one of the plurality of sections to display a different product.

9. The method of claim 2, wherein each section of the plurality of sections communicates at least one attribute to each of the other sections.

10. The method of claim 1, wherein determining a master section of the plurality of sections comprises:
    communicating, by each section of the plurality of sections, an identifier assigned to the section to each of the other sections;
    acknowledging, by each section of the plurality of sections, the identifier received from each of the other sections;
    generating, by each section of the plurality of sections, a list comprising the identifier received from each of the other sections;
    identifying, by each section of the plurality of sections, a master section based upon the list of identifiers.

11. The method of claim 10, wherein each section is assigned an identifier having a different value.

12. The method of claim 11, wherein the webpage assigns the identifier to each section.

13. The method of claim 10, wherein communicating the identifier to each of the other sections comprises:
    storing, by each section of the plurality of sections, a message comprising the assigned identifier in a storage area of the browser application; and
    transmitting, by the browser application, the stored message to each of the other sections.

14. The method of claim 13, wherein each section of the plurality of sections stores the message using a sessionStorage object.

15. The method of claim 10, wherein acknowledging the identifier received from each of the other sections comprises:
    storing, by each section of the plurality of sections, an answer message in a storage area of the browser application; and
    transmitting, by the browser application, the stored answer message to each of the other sections.

16. The method of claim 10, wherein identifying a master section based upon the list of identifiers comprises identifying the section of the plurality of sections that is assigned the identifier with the highest value.

17. The method of claim 10, wherein identifying a master section based upon the list of identifiers comprises identifying the section of the plurality of sections that is assigned the identifier with the lowest value.

18. The method of claim 10, wherein each section communicates the assigned identifier to each of the other sections upon being loaded into the webpage by the browser application.

19. The method of claim 10, wherein the master section transmits the attribute to the remote computing device upon expiration of a predetermined time period.

20. The method of claim 1, wherein the source code comprises an ad creative.

21. The method of claim 20, wherein the ad creative comprises an audio ad or a video ad.

22. The method of claim 1, wherein the communications between at least a subset of the plurality of sections to determine the master section comprise one or more messages transmitted between the at least a subset of the plurality of sections.

23. The method of claim 22, wherein each section of the at least a subset of the plurality of sections transmits a message to the other sections upon loading into the webpage.

24. The method of claim 1, wherein the plurality of sections comprise iframes.

25. The method of claim 1, wherein the master section transmits the attribute to the remote computing device using at least one of: a pixel in the webpage, an XML HttpRequest, a Fetch API, or a Beacon API.

26. The method of claim 1, wherein the communications between at least a subset of the plurality of sections to determine the master section are generated based upon a consensus algorithm.

27. The method of claim 1, wherein synchronizing a behavior of the plurality of sections comprises synchronizing an animation between at least a subset of the plurality of sections.

28. The method of claim 1, wherein synchronizing a behavior of the plurality of sections comprises synchronizing a product display between at least a subset of the plurality of sections.

29. A system for coordinating communications between a plurality of sections of a webpage, the system comprising a browser application at a client computing device that:
   renders a webpage comprising a plurality of sections, each section of the webpage containing source code;
   wherein each section of the plurality of sections:
      determines, using communications between at least a subset of the plurality of sections, a master section of the plurality of sections;
      and
      wherein the master section:
   determines one or more attributes associated with at least a subset of the plurality of sections in the webpage; and
   at least one of:
      transmits the one or more attributes to a remote computing device, or
      synchronizes a behavior of at least a subset of the plurality of sections in the webpage.

* * * * *